United States Patent [19]
Ely

[11] Patent Number: 5,982,418
[45] Date of Patent: Nov. 9, 1999

[54] DISTRIBUTED VIDEO DATA STORAGE IN VIDEO SURVEILLANCE SYSTEM

[75] Inventor: Reuel Andrew Ely, Plantation, Fla.

[73] Assignee: Sensormatic Electronics Corporation, Boca Raton, Fla.

[21] Appl. No.: 08/635,692

[22] Filed: Apr. 22, 1996

[51] Int. Cl.⁶ .................................................... H04N 7/18
[52] U.S. Cl. ........................................ 348/153; 348/154
[58] Field of Search ..................... 348/150, 153, 348/159, 143, 154; H04N 7/18

[56] References Cited

U.S. PATENT DOCUMENTS

| | | | |
|---|---|---|---|
| 4,736,218 | 4/1988 | Kutman | 354/81 |
| 4,833,534 | 5/1989 | Paff et al. | 348/151 |
| 4,943,854 | 7/1990 | Shiota et al. | 348/159 |
| 5,109,278 | 4/1992 | Erickson et al. | 358/108 |
| 5,111,291 | 5/1992 | Erickson et al. | 358/108 |
| 5,229,850 | 7/1993 | Toyoshima | 348/153 |
| 5,359,363 | 10/1994 | Kuban et al. | 348/36 |
| 5,521,634 | 5/1996 | McGary | 348/153 |
| 5,602,933 | 2/1997 | Blackwell et al. | 348/143 |
| 5,659,787 | 8/1997 | Schieltz | 395/200.56 |
| 5,724,475 | 3/1998 | Kristen | 386/109 |

*Primary Examiner*—Bryan Tung
*Assistant Examiner*—Nhon T. Diep
*Attorney, Agent, or Firm*—Robin, Blecker & Daley

[57] ABSTRACT

A video surveillance system includes a central control station and a plurality of video cameras each mounted inside a dome housing unit. A video data buffer memory, storing compressed video data generated by the camera, is mounted with each camera in the respective dome unit. Data buffered at the dome units may be selectively protected from overwriting in response to alarm signals and then retrieved for display or tape-recording by the central control station. Both live and buffered video signals are transmitted in compressed form over a data network that is also used for command, alarm and status messaging.

22 Claims, 6 Drawing Sheets

FIG. 4
CAMERA UNIT OPERATION

FIG. 5A
SYSTEM OPERATION

FIG. 5B
SYSTEM OPERATION

DISTRIBUTED VIDEO DATA STORAGE IN VIDEO SURVEILLANCE SYSTEM

FIELD OF THE INVENTION

This invention is related to video surveillance systems, and more particularly to surveillance systems of the type which include sensors for advising the system of alarm conditions.

BACKGROUND OF THE INVENTION

Figure 1:
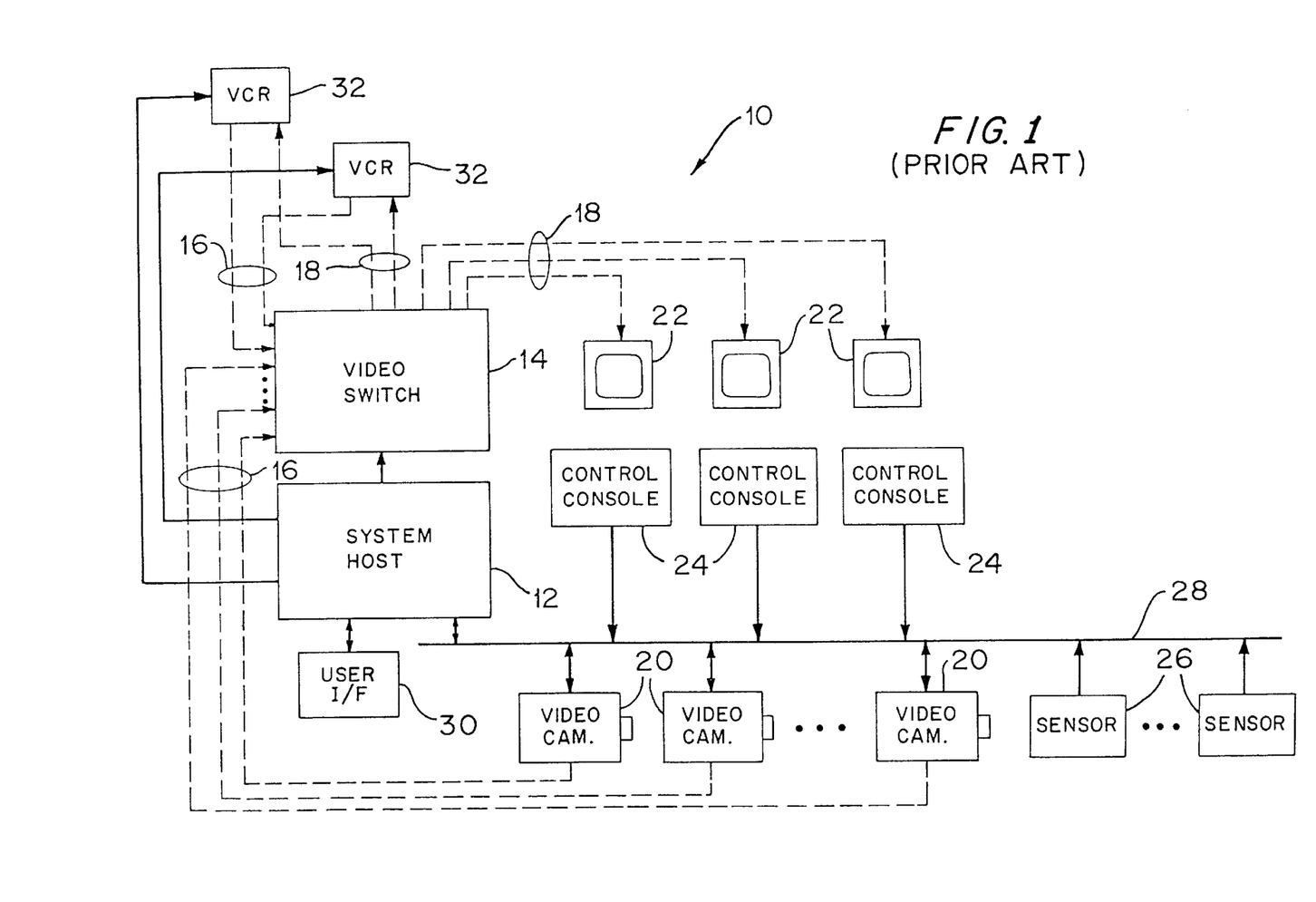
FIG. 1 is a block diagram of a conventional video surveillance system.

A conventional closed-circuit video surveillance system, indicated generally by reference numeral 10, is illustrated in block diagram form in FIG. 1.

The surveillance system 10 includes a host computer 12, which controls the operation of the system, a video switch 14 which selectively interconnects input video signals (represented by dashed lines 16) with outputs of the switch (represented by dashed lines 18). Also included in the system 10 are video cameras 20, monitors 22, control consoles 24, and sensor devices 26. A local area network 28 is provided for interchange of command, status and alarm data between the system host 12 and the cameras 20, control consoles 24 and sensors 26.

A user interface 30 is also provided to permit a system operator to control operations of the system. The interface 30 may incorporate a monitor and a control console which are not shown separately from the user interface 30. Also included in the system 10 are one or more video cassette recorders 32 which are available to record video signals that are generated by the video cameras 20 and selectively routed to the VCRs 32 by way of the video switch 14. Video signals previously recorded by the VCRs 32 can be played back by the VCRs 32 and selectively routed through the switch 14 for viewing on one or more of the monitors 22. As is well known to those who are skilled in the art, system host 12 also controls the video switch 14 so that, in response to control signals entered via the control consoles 24, video signals generated by a selected one of the video cameras 20 is routed for viewing at a selected one of the monitors 22. Sensors 26 generate alarm signals in response to anomalous events such as unauthorized opening of doors, windows or display cases. The system host 12 operates to inform the human operator of the alarm conditions, and predetermined camera movements and routing of corresponding video signals to pre-selected monitors 22 may be automatically actuated in response to alarm signals. Movement of the cameras can also be controlled through commands issued by the system host, in response to pre-programmed surveillance routines, or in response to operator input through the control consoles 24 or the user interface 30.

It is generally a desired goal in video surveillance systems that video signals representative of conditions before, during and after the onset of an alarm event be recorded for current and future reference, subsequent legal proceedings, and so forth, and it is for this purpose that the VCRs 32 are provided. However, surveillance systems frequently include a large number of video cameras (e.g., dozens or hundreds of cameras), and the cost of video cassette recorders is too high to permit recording of the signals generated by more than a few of the cameras at any given time. In conventional systems, video signals indicative of conditions prior to an alarm event cannot be recorded, unless the output of a video camera has been routed for recording by a VCR prior to the time an alarm event occurs.

To maximize the recording capacity of the VCRs, it is known to provide space-division-multiplexed (e.g., quad multiplexed) signals for recording on VCRs 32, and it is also known to operate the VCRs in a time lapse mode, with a reduced frame rate and switching among a number of cameras. When an alarm occurs, the time lapse mode can be automatically stopped in favor of a standard frame rate recording operation for the critical camera or cameras. In addition, critical cameras can be connected at all times for recording by a dedicated VCR. There are, however, disadvantages with all of these techniques. As noted above, it is quite expensive to provide a large number of VCRs, and if space-division-multiplexing is employed, the spatial resolution of the image signal is reduced, which may impair recognition of critical elements of the recorded images. On the other hand, time lapse recording suffers from reduced temporal resolution, so that again critical events may be missed. And, as noted before, if a camera having a view of an alarm event is not being recorded prior to the alarm event, the critical video information may simply fail to be captured.

An "intrusion monitoring system" disclosed in U.S. Pat. Nos. 5,109,278 and 5,111,291 (assigned to Commonwealth Edison) attempts to address some of these problems by providing an analog-to-digital converter and frame buffers at the output of a video multiplexer. Although the system disclosed in the Com Ed patents provides some capability for capturing and storing signals indicative of conditions at or before the time that an alarm event occurs, the system does not seem to be adapted to operate with a large number of cameras, and the temporal resolution is poor, especially when the system includes more than a minimal number of cameras.

OBJECTS AND SUMMARY OF THE INVENTION

It is accordingly an object of the invention to provide a video surveillance system having an improved capability for storage of video signals.

It is another object of the invention to provide a video surveillance system in which buffer storage is provided for video signals generated by all of the cameras in the system, and it is a further object to provide such buffer storage for all cameras in the system even when the number of cameras is large.

It is still a further object of the invention to provide a video surveillance system in which a human operator can conveniently control buffering and permanent recording of video signals generated by all of the video cameras in the system.

It is yet another object of the invention to provide a video surveillance system in which storage for video signals generated by each camera is carried out at low cost.

It is yet a further object of the invention to provide a video surveillance system which requires less cabling than conventional systems.

According to an aspect of the invention, there is provided a video surveillance system, including a central station, a plurality of video cameras located remotely from the central station for generating respective video signals, a plurality of storage devices, each located remotely from the central station and associated with a respective one of the video cameras for storing digital video data representative of the video signal generated by the respective video camera, and connection circuitry for forming a signal path between the central station and each of the storage devices.

Further in accordance with this aspect of the invention, the connection circuitry may include a plurality of control devices each operatively connected to a respective one of the storage devices for controlling the respective storage device to operate as a ring buffer in which digital video data representative of video signals currently generated by the respective video camera is written over oldest digital video data stored in the respective storage device. The surveillance system provided according to this aspect of the invention may further include a sensor device for generating an alarm signal indicative of an alarm condition, and circuitry for transmitting the alarm signal from the sensor device to the central station. The central station may respond to receiving the alarm signal by transmitting a storage signal to at least one of the control devices, such control device or devices responding to the storage signal by inhibiting over-writing of the oldest digital video data in the respective storage device or devices controlled by such control device or devices. Alternatively, the sensor device may be coupled to the connection circuitry for transmitting the alarm signal directly to the control device or devices, such device or devices responding to the alarm signal by inhibiting over-writing of the oldest digital video data in the respective storage device or devices controlled by such control device or devices.

Still further in accordance with this aspect of the invention, the central station may selectively transmit a retrieve signal to a selected one of the control devices, which responds to the retrieve signal by transmitting to the central station digital video data read out from the storage device controlled by the selected control device.

The system provided in accordance with this aspect of the invention may further include a display device associated with the central station for displaying images corresponding to the digital video data read out from the storage device and transmitted to the central station, as well as a video tape recorder controlled by the central station for recording signals corresponding to the digital video data read out from the storage device and transmitted to the central station.

The connection circuitry may include a common data transmission channel by which command signals are transmitted from the central station to the video cameras and digital video data read out from the storage devices is transmitted to the central station. The digital video data stored in the storage devices and transmitted by the data transmission channel may be compressed video data. Preferably each of the storage devices is a solid state memory and each is disposed in a respective housing together with the respective video camera.

According to another aspect of the invention, there is provided a surveillance video camera unit, including a housing which includes a light transmissive portion, a video camera disposed within the housing for forming an image from light which passes through the light transmissive portion of the housing and for converting the image into a video signal, and a storage device, disposed within the housing, for storing digital data representative of the video signal.

Further in accordance with the latter aspect of the invention, the video signal generated by the video camera may be an analog video signal, in which case the camera unit includes conversion circuitry disposed within the housing for converting the analog video signal into a digital video signal, and processing circuitry disposed within the housing for applying a data compression algorithm to the digital video signal to form compressed video data, the compressed video data being stored in the storage device. The conversion circuitry and the processing circuitry may be integrated with the video camera so that the video camera outputs the compressed video data to the storage device.

Still further in accordance with this aspect of the invention, the camera unit may include a control circuit disposed within the housing for controlling the storage device to operate as a ring buffer in which digital data representative of a video signal currently formed by the video camera is written over oldest digital data stored in the storage device. In response to receiving an event signal, the control circuit inhibits over-writing of the oldest digital data.

There may further be provided in the camera unit a plurality of motors disposed in the housing for changing pan, tilt and zoom conditions of the video camera, and the control circuit generates control signals for controlling the plurality of motors, the camera unit further including circuitry for transmitting the control signals from the control circuit to the plurality of motors. Preferably the storage device is a solid state memory.

According to still another aspect of the invention, there is provided a method of storing video signals, including the steps of generating digital video signals using a plurality of video cameras, storing the digital video signals generated by each camera in a respective storage device provided adjacent to the camera, and selectively transmitting to a central station the digital video signals stored in each storage device. Further in accordance with this aspect of the invention, the method may include operating the storage devices as ring buffers in which currently generated digital video signals are written over oldest digital video signals stored in the storage devices, and inhibiting the over-writing of the oldest digital video signals in response to receipt of an event signal. The method may also include the steps of tape-recording signals corresponding to the digital video signals transmitted to the central station, and displaying images corresponding to the digital video signals transmitted to the central station.

According to yet another aspect of the invention, there is provided a video surveillance system including a plurality of video cameras for generating the video signals, digital storage circuitry for storing the video signals in the form of digital video data, control circuitry for generating camera control commands, data transmission circuitry for forming a data communication channel by which the camera control commands are transmitted from the control circuitry to the plurality of video cameras, and circuitry for retrieving the stored digital data from the digital storage circuitry and for transmitting the retrieved digital video data to the control circuitry via the data communication channel formed by the data transmission circuitry.

The video signals generated by the video cameras may be analog video signals, in which case the digital storage circuitry includes circuitry for converting the analog video signals into digital video signals and circuitry for compressing the digital video signals to form compressed digital video data. Alternatively, the video signals generated by the video cameras may be in the form of compressed digital video data.

The digital storage circuitry may include a plurality of digital storage devices, each located adjacent to a respective one of the video cameras, and the retrieving circuitry may include a plurality of control devices, each associated with the respective one of the digital storage devices. Preferably, each of the storage devices is a solid state memory.

By providing a video surveillance system that includes camera units having digital storage for signals generated in the respective camera unit, video signals corresponding to conditions before, during and after an alarm event can be conveniently and reliably stored, and the locally stored video can be read out and transmitted to an operator-attended station at a convenient time for viewing and permanent recording on video tape. The data communication network used for transmission of command and status data between the system central station and the video cameras may be provided with sufficient capacity to handle transmission of compressed video data buffered or currently generated at the video camera units, in which case separate video signal transmission cabling can be dispensed with.

The foregoing and other objects, features and advantages of the invention will be further understood from the following detailed description of preferred embodiments and practices of the invention and from the drawings, wherein like reference numerals identify like components and parts throughout.

DESCRIPTION OF PREFERRED EMBODIMENTS AND PRACTICES

Figure 2:
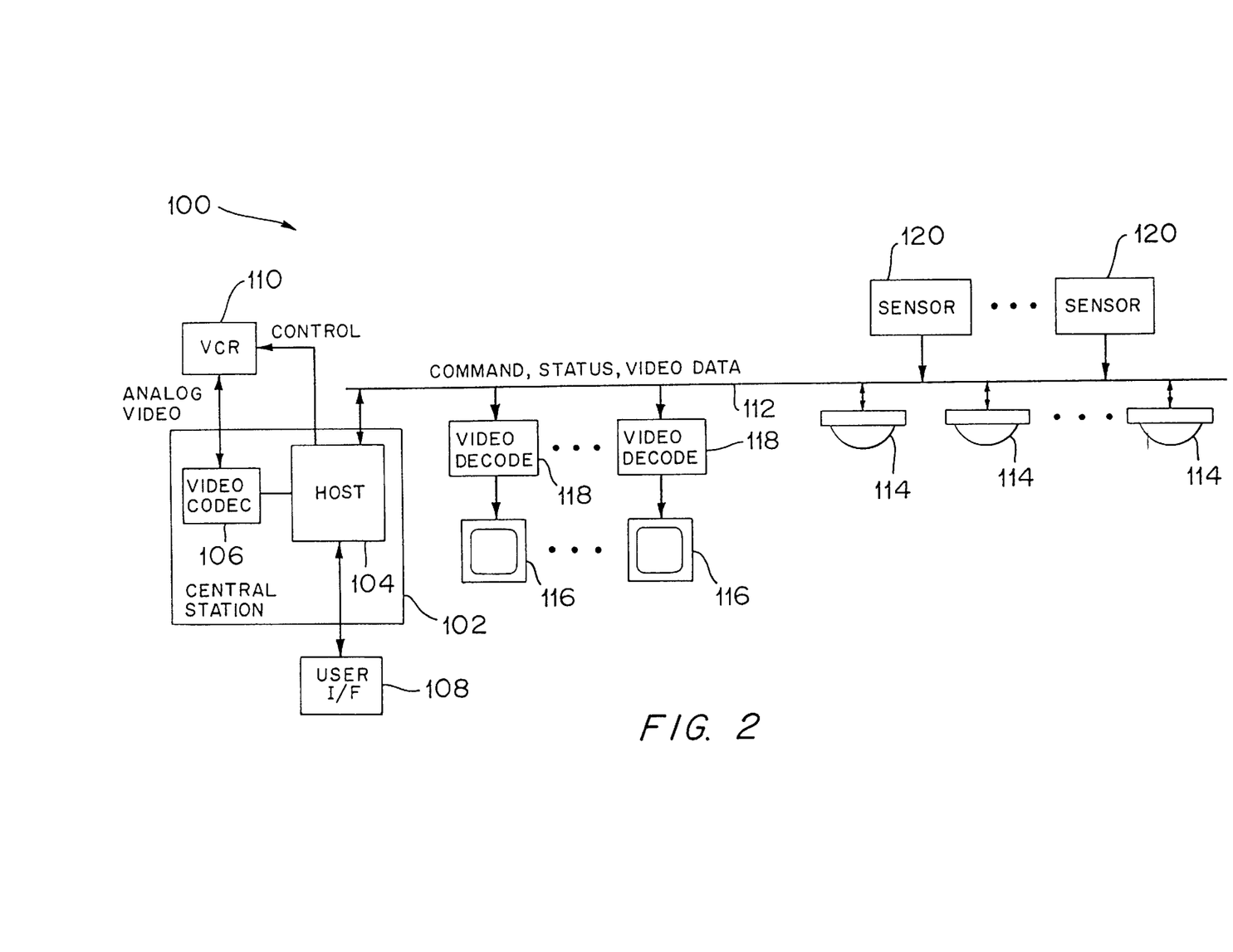
FIG. 2 is a block diagram of a video surveillance system provided in accordance with the present invention.

An embodiment of the invention will now be described, initially with reference to FIG. 2. Reference numeral 100 generally indicates a video surveillance system provided in accordance with the invention. The system 100 includes a central station 102 at which a host computer 104 is provided. Associated with the host computer 104 are a video data encoding/decoding device 106 and hardware and software required to provide a user interface, represented by block 108. The host computer 104 controls a video cassette recorder 110. A local area network (LAN) 112 is connected to the host computer 104. Data communicated between the host 104 and other components of the system 100 is carried over the LAN 112. Other system components connected to the host computer 104 via the LAN 112 include camera units 114, monitors 116 (each connected to the LAN 112 through a respective video data decoding device 118) and sensor devices 120. The sensor devices 120 are preferably of conventional types that detect, for example, unauthorized opening of doors, windows and display cases and the like and generate alarm signals indicative of these occurrences. The sensors 120 may also include conventional motion and/or heat sensing devices. The monitors 116 and the VCR 110 are also preferably conventional commercially-available items. It should be understood that although only one VCR 110 is shown in FIG. 2, two or more VCRs may be provided as part of the system 100.

Although the user interface 108 is represented separately from the monitors 116, it should be understood that the user interface preferably includes one or more of such monitors, as well as other input/output devices commonly provided as peripherals to personal computers. In addition, the user interface 108 may include one or more camera control devices such as the "TOUCHTRACKER" control consoles marketed by the assignee of this application. Additional camera control consoles, although not shown, may be provided in the system at or remote from the central station 102, and connected to the host 104 through the LAN 112.

Figure 3:
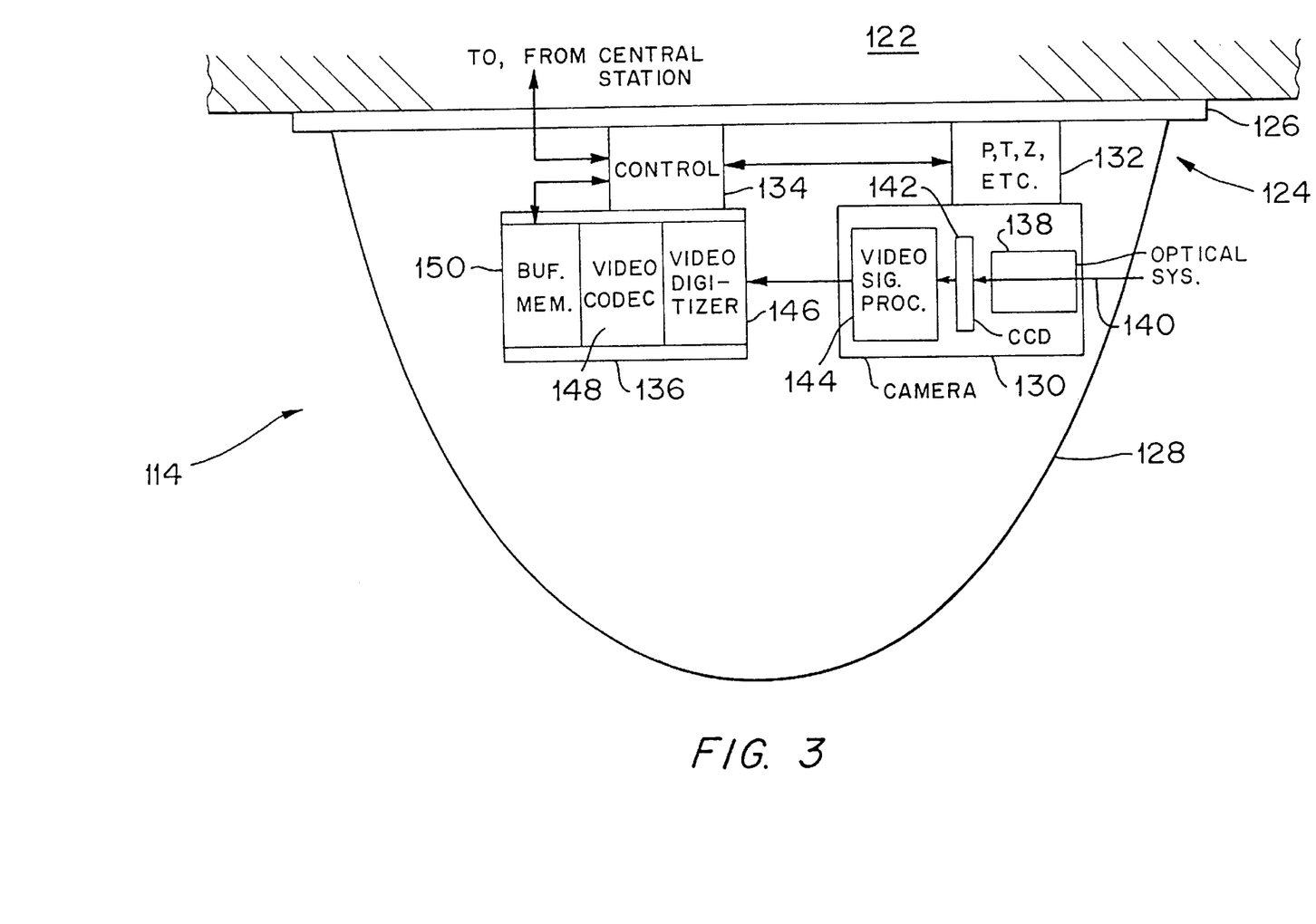
FIG. 3 is a schematic illustration of a video camera unit used in the system of FIG. 2.

The camera units 114 are preferably of a design provided in accordance with an aspect of the invention, as illustrated in FIG. 3.

Each camera unit may be mounted at a ceiling 122 or at another appropriate location, and includes a housing 124 constituted, at least in part, by a base portion 126 and a dome portion 128. In accordance with conventional practice, the dome portion 128 is formed of a light-transmissive material that allows light to enter the interior of the housing 124, although the material of which dome 128 is made be "one way" so that the interior of the unit 114 is screened from view.

Mounted within the housing 124 of the camera unit 114, and preferably mounted on the base portion 126, are a video camera 130, motors and other structure 132 for changing pan, tilt, zoom and/or other conditions of the camera 130, a control circuit 134, and a memory board 136. The camera 130 may be of conventional design, and includes an optical system 138 that receives and forms into an optical image light 140 which passes through the dome 128 into the interior of the camera unit 114. The image formed by the optical system 138 is converted into an electrical signal at CCD 142 and the resulting signal is subjected to conventional analog signal processing at video signal processing circuit 144. A suitable camera for use in the camera unit 114 is commercially available from the assignee of the present application, Sensormatic Electronics Corporation, as part number 2003-0037-00. Other suitable cameras are also commercially available.

The camera mounting structure, pan, tilt, and zoom motors, and so forth indicated by reference numeral 132 are also preferably of conventional design, such as are provided on commercially available camera dome units. The control circuit 134 may be a conventional microcontroller, such as is currently used in camera dome units to receive command signals from, and transmit status data to, a system central control station, and also for controlling the camera motors and detecting the status (such as position) of the camera motors, in a conventional manner. However, the control circuit 134 shown in FIG. 3 is also programmed, according to practices of the present invention, to carry out memory control, as well as data storage and retrieval functions that will be described below.

The memory board 136 is provided in accordance with the invention to receive an analog video signal output from the camera 130 and to digitize, compress and store the video signal. Components of the memory board 136 include a video digitizer circuit 146, a video data coding/decoding circuit 148 and a memory device 150. The video digitizer 146 may be suitably realized by the "WAVEWATCHER TV II" video digitizer card available from AITech International, Fremont, Calif. A suitable video codec is the model VCI-10, available from VistaCom, OY, Tietajantie 14, 02130, Espoo, Finland. The model VCI-10 compresses video data in accordance with the H.261 standard, and also provides the function of reconstituting video data that has been compressed in accordance with that standard. The memory device 150 may be constituted by one or more of RAM, EEPROM, flash memory, and so forth. As will be seen, the memory device 150 functions as a buffer for the video signal generated by the camera 130, and is controlled by the control circuit 134.

It is expected that, within a short time, there will become commercially available video cameras which incorporate the video signal digitizing and compression functions carried out at blocks 146 and 148 in FIG. 3. For example, commercial introduction of a video camera which outputs compressed digital video data in accordance with the above-mentioned H.261 standard is anticipated. Such a camera could be used in place of the camera 130 shown in FIG. 3, and the separately-provided video digitizer 146 and video codec 148 could be omitted, with the compressed digital video signal output from the camera being stored directly in the memory device 150 under the control of the control circuit 134.

Figure 4:
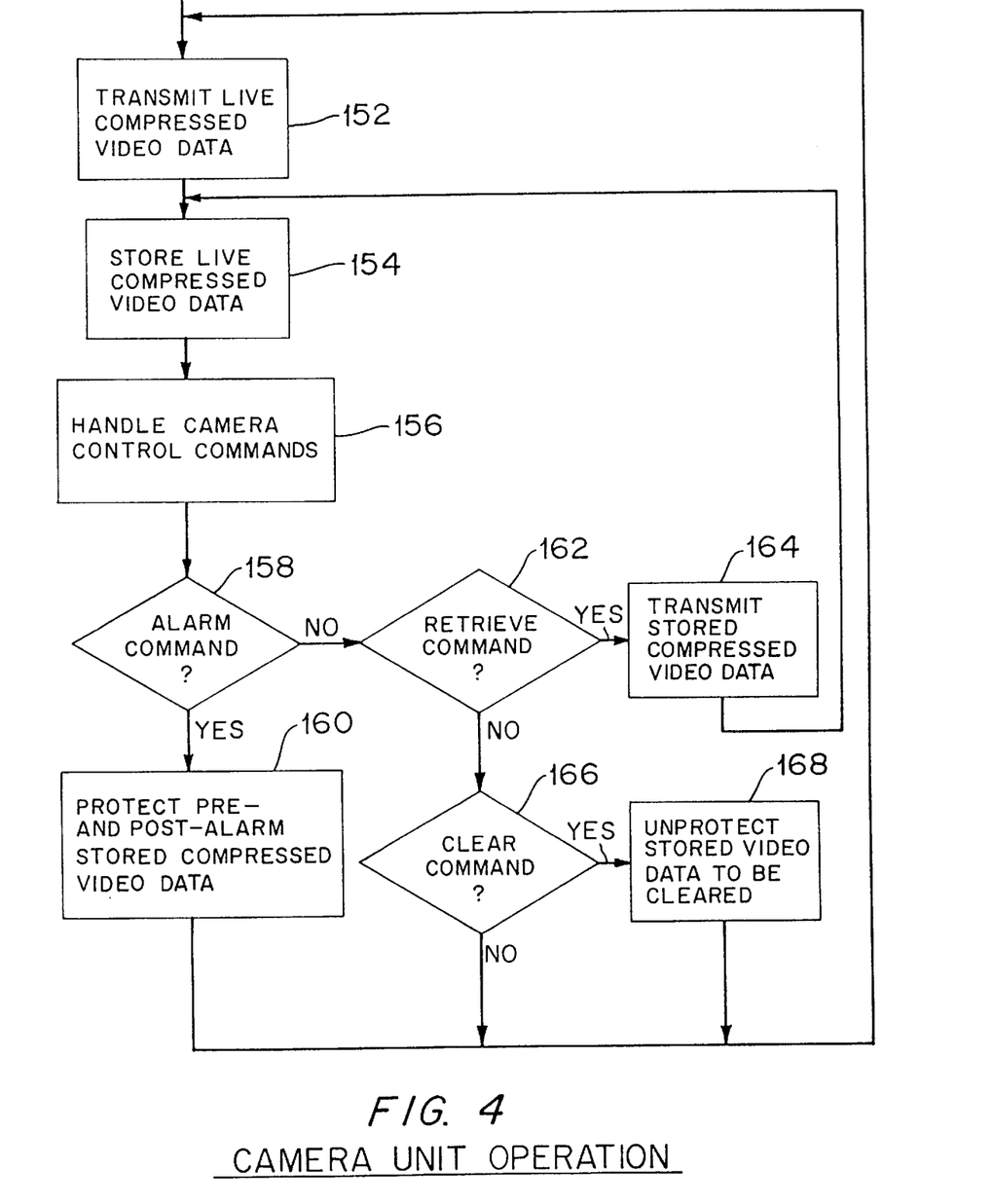
FIG. 4 is a flow chart of processes carried out in a control circuit that is part of the camera unit of FIG. 3.

Operation of the camera unit 114 will now be described, with reference to FIG. 4, which illustrates processes carried out by the control circuit 134 under the control of a stored program. (It will be understood that the program memory is not shown separately from the control circuit 134.)

One ongoing process carried out under normal conditions by the control circuit 134 is transmission to the central station (via LAN 112) of compressed video data which represents video signals currently being generated by the camera 130. This process, represented by block 152, includes receiving the live compressed video data from the video codec 148 and coupling the data onto the LAN 112, either according to predetermined time slots, or in response to commands from the central station, or according to some other protocol. In parallel with the process represented by block 152, the live compressed video data formed by the video codec 148 is also stored in the memory 150. Preferably the memory addressing and writing of data into the memory is controlled by the control circuit 134 so that the memory 150 serves as a ring buffer, in which currently generated compressed video data is written over the oldest compressed video data that had previously been stored in the memory 150. However, over-writing of the oldest data is subject to inhibition in response to alarm commands. On such occasions, the live compressed video data is written into a portion of the memory device 150 which does not hold video data that is to be preserved.

In a third ongoing process, represented by block 156, the control circuit 134 handles camera control commands received via the LAN 112. The handling of camera control commands is in accordance with conventional practice, and a further discussion thereof consequently will be omitted.

Concurrently with the ongoing processes of blocks 152, 154 and 156, the control circuit 134 is conditioned to receive occasional alarm commands, as indicated by decision block 158. When an alarm command is received, a process (indicated by block 160) is carried out in which the control circuit 134 protects from over-writing compressed digital video data previously stored in the memory 150, and corresponding to a time interval beginning at a predetermined time prior to receipt of the alarm command, and continuing for a predetermined time after receipt of the alarm command.

The control circuit 134 is also conditioned (as indicated by decision block 162) to receive commands calling for reading-out and transmission to the central station of previously-stored compressed video data. The stored data to be retrieved may be data that was previously protected from over-writing in response to an alarm command, or may be other data that has previously been stored in the buffer memory 150. When a retrieve command is received, a process for reading out the stored data from the buffer memory and transmitting the read-out data via the LAN 112 is carried out, as represented by block 164. The transmission of the compressed video data that was read out from the memory 150 may be in place of, or virtually in parallel with, continued transmission of "live" compressed video data. Preferably, as suggested by FIG. 4, transmission of stored compressed video data in response to corresponding retrieval commands does not interrupt ongoing storage of "live" video data.

As indicated by decision block 166, the control circuit 134 is also conditioned to receive "clear" commands, in response to which the control circuit removes a previously protected block of stored video data from protection, thereby permitting "live" video data to be written over the now-unprotected stored video data.

Overall operation of the system 100 (FIG. 2) will now be described, with reference to FIGS. 5A and 5B, which illustrate processes carried out by the host computer 104.

Figure 5A:
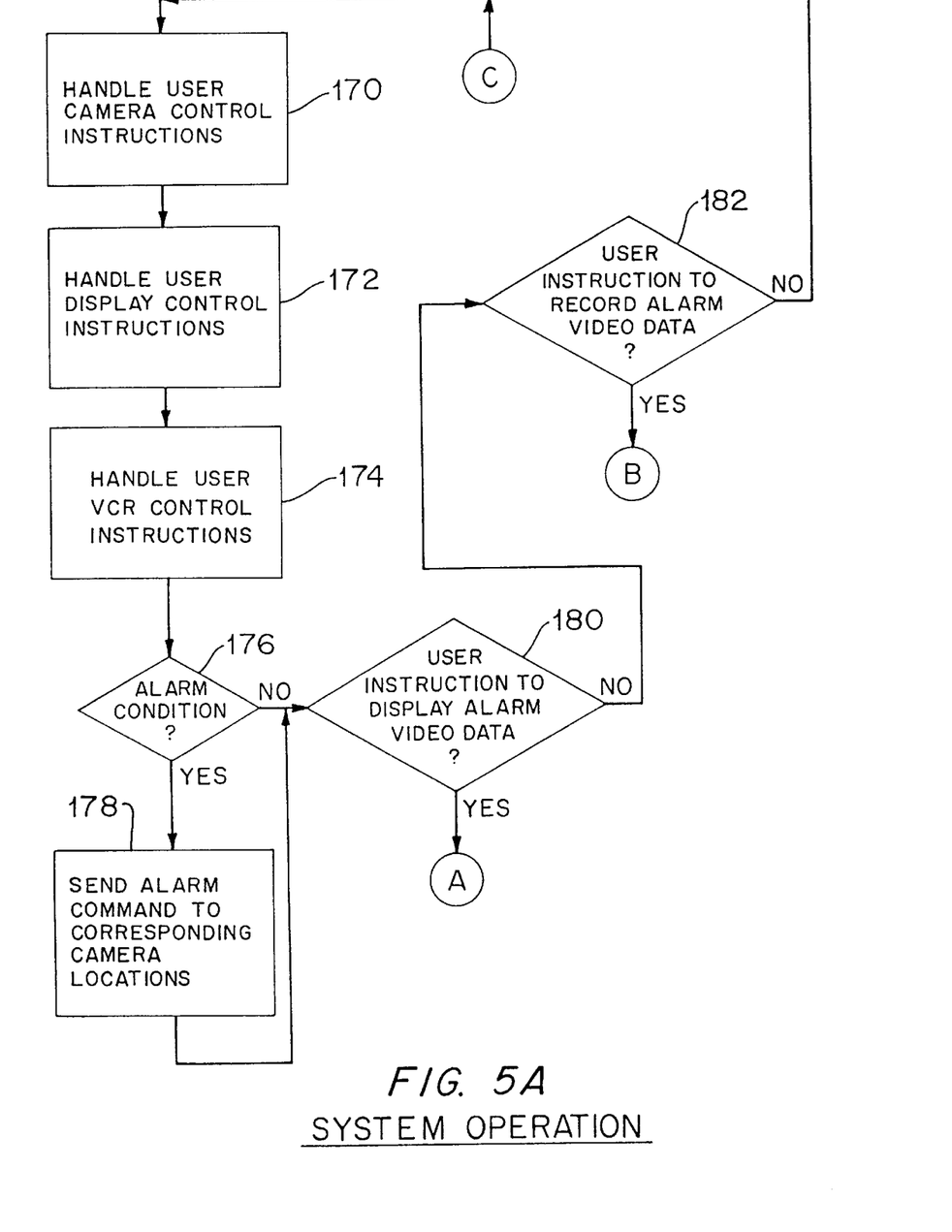
FIGS. 5A and 5B together form a flow chart of processes carried out in a host computer that is part of the system of FIG. 2.

As indicated at block 170 in FIG. 5A, one ongoing process performed by the host computer 104 entails controlling camera movements, etc., in response to instructions input by users of the system. The instructions may be received either through the user interface 108, or via separate camera control consoles, which are not shown. The receipt of user instructions, processing of same by the host computer 104, generation of command data and transmission of the command data via LAN 112, and camera movements (pan, tilt, zoom, etc.) in response to the commands are all preferably carried out in a conventional manner, and therefore will not be described further. The process 170 can also be considered as encompassing receipt and processing of status data transmitted on the LAN 112 by the camera units 114, in accordance with conventional practice. Although the discussion up to this point has suggested that all user camera control instructions are processed in the host 104 and then relayed to the cameras 114 via the LAN 112, it is also contemplated that camera control consoles (not shown) connected to the LAN 112 may generate commands that are addressed directly to, and processed only by, camera units 114.

Another ongoing function carried out by the host computer 104 is indicated at block 172 in FIG. 5A, and relates to handling user instructions for displaying "live" video signals generated by the cameras 114. In essence, the user instruction, as in conventional systems, specifies a particular camera unit, as well as a particular monitor on which the signals generated by the camera unit are to be displayed. In conventional systems, such as the system illustrated in FIG. 1, display control instructions are implemented by controlling a video switch to make an appropriate connection between an input and an output of the video switch. However, a salient characteristic of the system architecture shown in FIG. 2 is the omission of both the video switch and the analog video signal paths that are found in conventional systems. Instead, in the system of FIG. 2, video signals are transmitted over the LAN 112 in the form of compressed digital video data. The "routing" of live video from a selected camera unit to a selected monitor is therefore carried out on a "virtual" basis. This may be done in a number of ways. For example, live compressed video may be received by the host 104 from the camera unit (by way of LAN 112) and then retransmitted by the host 104 to the selected monitor 116, again via the LAN 112. Alternatively, the control circuit 134 of the selected camera unit 114 can be instructed to address live video data directly to the selected monitor 116. The latter technique may be advantageous in that, when live video is not required from a given camera unit, the camera unit can be instructed not to transmit live video data (or instructions to transmit can be omitted) thereby removing traffic from the LAN 112. In either of these cases, it will be understood that the video signal intended for a specified monitor 116 is received in compressed digital form at the video decoder 118 associated with the monitor 116 and is decompressed and otherwise suitably processed at the decoder 118 to provide a signal which can be displayed on the monitor 116. According to another possible method of "routing" live video, the video decoders 118 may be conditioned to receive commands from the host 104, in response to which a video decoder associated with a selected monitor 116 decodes and processes all video data transmitted on the LAN 112 by the camera unit 114 selected for display on the respective monitor 116. In other words, the virtual routing connection is made via an instruction to the receiving device (the video decoder 118) rather than via an instruction to the sending device (the camera unit 114/control circuit 134).

Whether these techniques, a combination thereof, or other techniques are utilized, it will be appreciated that the LAN 112 should be selected so as to provide sufficient bandwidth to accommodate not only conventional command, status and alarm signaling, but also the transmission of live video data as required. In addition, the LAN 112 must also handle transmission of video data that has been buffered at the camera units 114, as will be described in more detail below.

It should be understood that conventional split-screen techniques, including use of video multiplexers such as conventional quad multiplexers, are also contemplated for incorporation in the system of FIG. 2, although hardware for performing these functions is not explicitly shown in the drawing.

Another ongoing function of the host computer 104, represented by block 174 in FIG. 5A, involves handling user instructions concerning operation of the VCR 110. The user instructions may include recording on videotape of either live or buffered video data received via the LAN 112, or playback of previously tape-recorded video signals. When compressed video data received via the LAN 112 by the host 104 is to be recorded, the received video data is supplied from the host 104 to the video coder/decoder 106 for decompression and conversion into an analog video signal which is supplied to the VCR 110. Concurrently, the host computer 104 provides a control signal that places the VCR in a mode for recording the analog video signal output from the video codec 106. When the user instruction indicates that playback of tape-recorded video is to be performed, the host 104 places the VCR 110 in a playback mode, and the analog video output from the VCR 110 is subjected to appropriate processing within the central station 102 and then routed for display on a selected monitor, which may be part of the user interface 108.

The system architecture shown in FIG. 2 assumes that conventional analog video tape recording is to be performed at VCR 110. However, an alternative contemplated by the invention provides for use of a digital video tape recorder (DVTR), in which case the video codec 106 processes the compressed video data supplied from the host 104 in an appropriate manner so as to output a digital video signal that is suitable for recording on the DVTR.

It is also contemplated to permanently record compressed video data in the same form as transmitted over LAN 112. For example, a suitable data recorder could be connected to LAN 112 to record compressed video data directly therefrom under control of the host 104. A data recorder could also be operated continuously to record all traffic on the LAN, including both live and buffered video data. Such a recorder may use linear or helical-scan tape recording, or may operate with a non-tape recording medium.

As indicated at blocks 176 and 178 of FIG. 5A, the host computer 104 is also responsive to alarm conditions, as may be indicated by signals generated from the sensor devices 120. When a signal indicative of an alarm condition is transmitted by a sensor 120 via the LAN 112 to the host computer 104, the host responds by sending an alarm command to certain predetermined camera units 114. For example, if the sensor 120 is associated with a given door, and indicates unauthorized opening of the door, the alarm command is sent to a camera unit or units that have the door within their field of view. As was discussed above in connection with blocks 158 and 160 of FIG. 4, the corresponding camera unit or units respond to the alarm command by protecting buffered video data which corresponds to a predetermined pre- and post-alarm time period. The protected data is then available for subsequent retrieval, display, and permanent recording via the VCR 110. After the compressed video data stored at one of the camera units has been protected pursuant to an alarm command, the data (which will sometimes be referred to as "alarm data") can be selectively retrieved in response to user instruction either for display (block 180) or directly for taperecording (block 182).

Figure 5B:
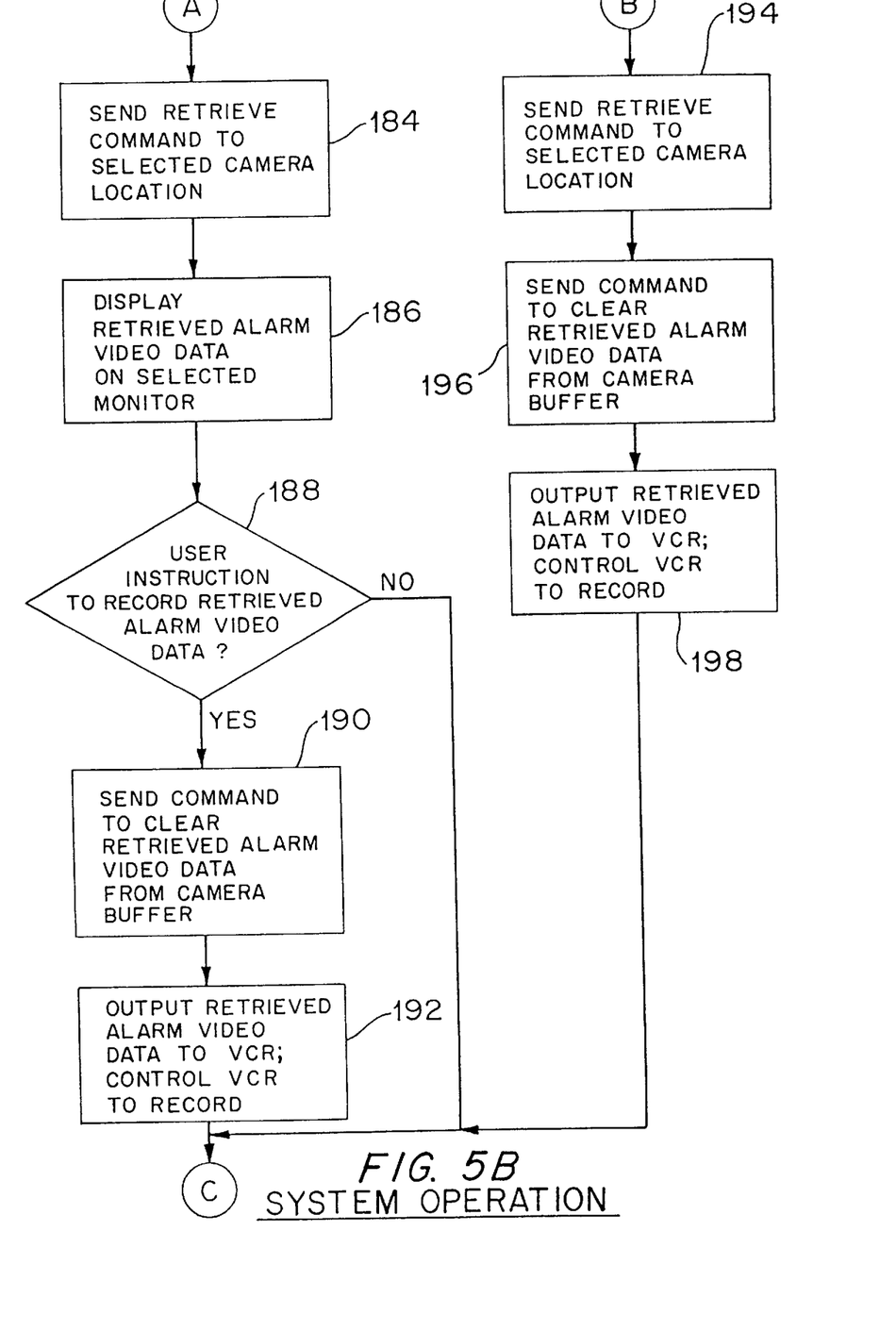

If a user indicates that a block of alarm video data is to be displayed, the host 104 sends a retrieve command (via LAN 112) to the selected camera unit 114 (block 184, FIG. 5B). The desired alarm data is then read out from the buffer memory in the designated camera unit and transmitted via the LAN 112, as was discussed above in connection with blocks 162 and 164 (FIG. 4). The transmitted data is then "virtually routed" to a designated monitor (block 186), by, for example, any of the practices that were previously described in connection with routing of live video. The selected monitor may be a portion of the user interface 108, in which case the routing may be by way of the host 104. After the alarm data has been retrieved, the user has the option, indicated at block 188, of recording the retrieved alarm data. If this option is exercised, the alarm data, having been re-buffered at the host computer 104, can be cleared from the camera unit buffer by sending a clear command (block 190, FIG. 5B) which causes the camera unit to unprotect the data, as previously discussed in connection with block 168 (FIG. 4). The retrieved alarm data is then processed at the codec 106 and output as an analog video signal for recording by the VCR 110 (block 192). Of course, the host 104 concurrently provides a command signal to the VCR to place it in a recording mode.

As noted before, the user may opt to record alarm data buffered at a camera unit. If the user so elects (block 182), then the host 104 sends a retrieve command to the selected camera unit (block 194, FIG. 5B). After retrieval of the alarm data is complete, a clear command is sent (block 196) to the camera unit to clear the retrieved alarm data from the camera unit buffer, and the retrieved alarm data is recorded on the VCR (block 198).

The processes illustrated in FIGS. 5A and 5B call for un-protecting of alarm data buffered in camera units once the data has been retrieved by the central station for taperecording. However, other or additional camera buffer management practices are also contemplated. For example, assume that each camera unit buffer has a storage capacity which corresponds to thirty minutes of video signals, and that each alarm command initiates protection of buffered video signals corresponding to a ten minute period (say five minutes prior to the alarm and five minutes after). Each camera unit can be arranged so that, after a third block of alarm data has been protected and not cleared, then the succeeding live data is written over the oldest of the three blocks of alarm data. As another alternative, the camera unit could send a message to the central station when a predetermined proportion of the camera unit's buffer memory has been utilized for protected storage, and then the central station would operate to direct retrieval of the alarm data from the buffers and clearing from the buffer of the retrieved data.

It is also contemplated that downloading of the alarm data from the camera units to the central station could be performed in background, as time becomes available on the LAN 112, rather than on a priority basis in response to commands issued by the central station.

It should be understood that retrieval of buffer data which has not been protected is also contemplated.

As an alternative to the "all-digital" architecture shown in FIG. 2, in which the LAN 112 provides the only link among the central station 102, the monitors 116 and the camera units 114, it is also contemplated in accordance with the invention to provide an architecture like that of FIG. 1, but utilizing camera units having local buffering capabilities like those of the unit illustrated in FIG. 3. In such an embodiment, both live and buffered video are output from the camera unit in the form of conventional analog video signals and are transmitted via appropriate signal lines to a video switch provided at the central station. The system host controls the video switch for routing in accordance with conventional practice, and the signals output from the video switch are transmitted via appropriate lines to the monitors and the VCRs. Such an embodiment would remove the burden of video data transmission from the LAN used for command, status and alarm messages, while still providing a capability for local buffering of video signals at the camera units, with selected retrieval of the buffered video at the command of the central system or according to predetermined procedures. However, if sufficient bandwidth is available on the LAN, the all-digital architecture of FIG. 2 is preferred, since neither the video switch nor the separate analog video transmission lines would be required.

Alarms or other events that trigger protection of buffered video data may be initiated by techniques in addition to those discussed above. For example, in addition to or in place of sensor-generated alarms, an alarm condition can be generated by a system operator via the user interface, or an alarm condition can be detected by machine analysis of the content of live video signals generated by one or more of the camera units.

Various other changes in the foregoing apparatus and modifications in the described practices may be introduced without departing from the invention. The particularly preferred methods and apparatus are thus intended in an illustrative and not limiting sense. The true spirit and scope of the invention is set forth in the following claims.

What is claimed is:

1. A video surveillance system comprising:
   a central station;
   a plurality of video cameras, located remotely from said central station, for generating respective video signals;
   a plurality of storage means, each located remotely from said central station and associated with a respective one of the video cameras for storing digital video data representative of the video signal generated by the respective video camera;
   connection means for forming a signal path between said central station and each of said storage means, said connection means including a plurality of control means each operatively connected to a respective one of said storage means for controlling the respective storage means to operate as a ring buffer in which digital video data representative of video signals currently generated by the respective video camera is written over oldest digital video data stored in the respective storage means;
   sensor means for generating an alarm signal indicative of an alarm condition; and
   means for transmitting said alarm signal from said sensor means to said central station;
   wherein said central station responds to receiving said alarm signal by transmitting a storage signal to at least one of said control means, said at least one of said control means responding to said storage signal by inhibiting overwriting of said oldest digital video data in the respective storage means controlled by said control means.

2. A video surveillance system according to claim 1, wherein said central station selectively transmits a retrieve signal to a selected one of said control means, said selected control means responding to said retrieve signal by transmitting to said central station digital video data read out from the storage means controlled by said selected control means.

3. A video surveillance system according to claim 2, further comprising display means associated with the central station for displaying images corresponding to the digital video data read out from the storage means and transmitted to the central station.

4. A video surveillance system according to claim 3, further comprising a video tape recorder controlled by said central station for recording signals corresponding to the digital video data read out from the storage means and transmitted to the central station.

5. A video surveillance system according to claim 1, wherein said connection means includes a common data transmission channel by which command signals are transmitted from said central station to said video cameras and digital video data read out from said storage means is transmitted to said central station.

6. A video surveillance system according to claim 1, wherein said digital video data stored in said storage means and transmitted by said data transmission channel is compressed digital video data.

7. A video surveillance system according to claim 1, wherein each of said storage means is a solid state memory.

8. A video surveillance system according to claim 1, wherein each of said storage means is disposed in a respective housing together with the respective video camera.

9. A video surveillance system, in accordance with claim 1, wherein:
   the video cameras and the storage means associated with that video camera form a plurality of respective camera units
   said connection means and said means for transmitting said alarm signal are part of a local area network (LAN) connected among all of said central station, said camera units and said sensor means, for transmitting said digital video data from said storage means to said central station and for transmitting said alarm signal from said sensor means to said central station.

10. A video surveillance system according to claim 9, further comprising a plurality of monitors, connected to said LAN, for receiving and displaying video signals corresponding to video signals generated by said camera units.

11. A video surveillance system according to claim 10, wherein digital video data transmitted via said LAN from one of said camera units to said central station is retransmitted via said LAN from said central station to one of said monitors for display on said one of said monitors.

12. A video surveillance system according to claim 10, wherein digital video data is transmitted via said LAN directly from one of said camera units to one of said monitors for display on said one of said monitors.

13. A video surveillance system according to claim 9, wherein control signals are transmitted via said LAN from said central station to said camera units for controlling said camera units.

14. A video surveillance system according to claim 9, further comprising a camera control console, connected to said LAN, for generating signals for controlling said camera units.

15. A video surveillance system according to claim 9, further comprising a data recorder, connected to said LAN, for recording digital video data transmitted via said LAN.

16. A video surveillance system according to claim 9, wherein digital video data is transmitted via said LAN from one of said camera units at substantially the same time that a video signal corresponding to said digital video data is generated at said one of said camera units.

17. A video surveillance system according to claim 9, wherein digital video data stored in one of said camera units is transmitted via said LAN to said central station from one of said camera units in response to a retrieve command transmitted via said LAN from said central station to said one of said camera units.

18. A video surveillance system according to claim 9, wherein:

first digital video data is transmitted via said LAN from one of said camera units at substantially the same time that a video signal corresponding to said first digital video data is generated at said one of said camera units; and second video data stored in one of said camera units is transmitted via said LAN to said central station from said one of said camera units in response to a retrieve command transmitted via said LAN from said central station to said one of said camera units.

19. A video surveillance system, comprising:

a central station;

a plurality of camera units each including a respective video camera for generating respective video signals and a respective digital storage device for storing digital video data representative of the video signal generated by the respective video camera;

a plurality of sensors each for generating a respective alarm signal indicative of an alarm condition;

message means interconnecting said central station, said camera units and said sensors, for transmitting command messages from said central station to said camera units and for transmitting said alarm signals from said sensors to said central station;

a plurality of monitors for receiving and displaying video signals corresponding to video signals generated by said camera units;

a video switch;

first analog signal lines, connected between said video switch and said camera units, for transmitting analog video signals from said camera units to said video switch; and second analog signal lines, connected between said video switch and said monitors, for transmitting analog video signals from said video switch to said monitors;

said central station controlling said video switch to couple selected ones of said first analog signal lines to selected ones of said second analog signal lines to route analog video signals from said camera units to said monitors;

said analog video signals routed to said monitors from said camera units including analog video signals corresponding to signals retrieved from said digital storage devices pursuant to command signals transmitted via said message means from said central station to said camera units each of said camera units including control means for controlling the respective digital storage device to operate as a ring buffer in which digital video data representative of video signals currently generated by the respective video camera is written over oldest digital video data stored in the respective digital storage device; and said central station responding to receiving an alarm signal from one of said sensors by transmitting a storage signal to at least one of said control means, said at least one of said control means responding to said storage signal by inhibiting overwriting of said oldest digital video data in the respective digital storage device controlled by said control means.

20. A video surveillance system according to claim 19, wherein said message means includes a local area network (LAN) connected among said central station, said camera units and said sensors.

21. A video surveillance system according to claim 19, wherein said analog video signals routed to said monitors from said camera units include live video signals.

22. A video surveillance system according to claim 19, further comprising:

a plurality of video cassette recorders (VCRs); and third analog signal lines, connected between said video switch and said VCRs, for transmitting analog video signals from said video switch to said VCRs;

said central station controlling said video switch to couple selected ones of said first analog signal lines to selected ones of said third analog signal lines to route analog video signals from said camera units to said VCRs.

* * * * *